Dec. 7, 1954     A. A. LAHTI ET AL     2,696,562

TRANSMISSION

Filed Jan. 5, 1953     2 Sheets-Sheet 1

ARVO A. LAHTI
PAUL S. GOODWIN
CHARLES G. BLANCHARD
         INVENTORS.

BY *James B. Christie*

ATTORNEY

ARVO A. LAHTI
PAUL S. GOODWIN
CHARLES G. BLANCHARD
INVENTORS.

BY James B. Christie

ATTORNEY

# United States Patent Office 2,696,562
Patented Dec. 7, 1954

2,696,562

TRANSMISSION

Arvo A. Lahti and Paul S. Goodwin, Pasadena, and Charles G. Blanchard, Arcadia, Calif., assignors to Consolidated Engineering Corporation, Pasadena, Calif., a corporation of California Application January 5, 1953, Serial No. 329,506

4 Claims. (Cl. 250—41.9)

This invention relates to a transmission system wherein the transfer function is made a function of output position. The invention also relates to improvements in mass spectrometer magnet systems as embodying the transmission.

A variable speed transmission is one in which the ratio of output shaft velocity and input shaft velocity may be varied continuously throughout a designed range. Conventional transmissions of this type involve frictional, electrical, hydraulic or magnetic coupling between the input and output shafts. The term "shaft" is used herein as representative of any form of input and output means.

In any of the conventional forms of variable speed transmissions the transfer function, i. e. the ratio of output shaft velocity to input shaft velocity, is varied responsive to an external stimulus applied to vary the significant parameter determinative of this function. This parameter in a friction drive transmission, for example, may be the contact radii of two conical coupling members linked respectively to input and output shafts. In a hydraulic transmission variation in fluid transfer characteristics will accomplish the same end and in magnetic and electrical transmissions the transfer function may be determined by controlling the electrical or magnetic field strength.

At present, however, none of the conventional transmissions are capable of determining the transfer function as a function of output shaft position. The present invention is directed to a transmission in which the external stimulus acting on the parameter determinative of transfer function is furnished as a predetermined function of output shaft position. In this regard, output shaft position, which is an angular function, may be considered as any fractional or integral multiple of a single revolution.

The significant factors of interest relative to such transmissions are defined as follows:

$\theta_i$ = input shaft position (angularity)

$\theta_o$ = output shaft position (angularity)

$d\theta_i/dt$ = input shaft velocity $d\theta_o/dt$ = output shaft velocity $R =$ transfer function $= \dfrac{d\theta_o}{dt} \bigg/ \dfrac{d\theta_i}{dt} = \dfrac{d\theta_o}{d\theta_i}$ The invention comprises in a variable speed transmission having adjustment means operable to vary the transfer function, the combination comprising detector means adapted to sense the angular position of the output means, control means operable to control the adjustment means, and means connected between the sensing means and the control means to actuate the control means responsive to the output of the sensing means.

Since output shaft position is the time integral of velocity, and in the transmission of the invention output shaft velocity is made a function of position (by virtue of maintaining input velocity $d\theta_i/dt$ constant) the parameters' time, position and velocity become dependent variables. The mechanism is thus useful in any application wherein control of position and velocity as a predetermined function of time is desired. Moreover, the system is applicable wherever it is desired to correlate any of these three parameters to either of the remaining two.

One example of the field of use of a transmission of this type is in mass spectrometry. In one form of mass spectrometer ions are caused to pursue a curvilinear path under the influence of a transverse magnetic field. The radius of travel of ions of any given specific mass is a function of the specific mass, of the velocity of the ions through the magnetic field, as determined by an accelerating electrical field, and the strength of the magnetic field. To scan a spectrum of different ion masses in such a manner that successive masses of interest are focused on a stationary collector electrode after passage through the transverse magnetic field, either the magnitude of the accelerating electrical field or the magnitude of the magnet field can be altered. In the so-called magnetic scan instrument it is this latter parameter that is varied to scan a mass spectrum.

One means of varying the strength of a magnetic field for the purpose of mass scan in a mass spectrometer comprises a variable shunt magnet. A magnet system of this type is described and claimed in U. S. Patent No. 2,593,508 issued to Harold W. Washburn on April 22, 1952. This type of magnet is characterized by spaced magnet poles in the gap of which a mass spectrometer analyzer tube is disposed and which are provided with position variable shunts contacting the poles adjacent the gap. By means of position adjustment of the shunts, the strength of the magnetic field in the gap, and hence across the spectrometer tube, is varied to accomplish the desired scan. However, the variation in field strength with a given displacement of the shunts is in accordance with the function $B(1-K/X)$ where B is total flux, K is a constant of proportionality and X is the spacing between the shunts. Moreover, to obtain the desired mass separation with respect to time in such a scanning procedure it is necessary to vary the field strength exponentially since the effect of specific mass, one of the three mentioned variables determinative of mass scan, decreases exponentially with mass. In other words, mass 49 and mass 50, for example, are closer together in space at a given set of operating conditions than are ion masses 19 and 20, and the change in magnetic field required to successively focus the two heavier masses on a collector electrode for a given degree of resolution must be at a slower rate than the change to successively focus the lighter masses for the same degree of resolution.

By coupling the transmission of the invention to the mechanical means for positioning the shunts, and by suitably developing the feedback between output shaft position and the means controlling the transfer function adjustment means, it is possible to control the shunt position and hence the magnetic field in any desired manner with respect to time. At the same time any lack of synchronization between the operation of the control means and the shunt drive is eliminated since they are made dependent by the feedback means of the invention.

In the normal operation of a magnetic scan mass spectrometer of the type described it is conventional to repeat the spectrum scan in succeeding cycles. For this purpose, and in the practice of the invention as applied to such a mass spectrometer, additional means are provided to reset the transmission system at the completion of each mass scan so as to reset the output shaft of the transmission and the magnet shunts to the beginning position and the transfer function to the beginning value.

The invention therefore additionally contemplates in a mass spectrometer including a mechanically variable shunt magnet, the combination comprising a variable speed transmission having an output shaft connected to vary the position of the magnet shunt, detector means adapted to sense the position of the output shaft, adjustment means operable to vary the transfer function of the transmission, control means operable to regulate the adjustment means, and means coupled between the detector means and the control means to actuate the control means responsive to the output of the sensing means.

The invention will be more clearly understood by reference to the following detailed description thereof taken in conjunction with the accompanying drawings, in which.

Figure 1:
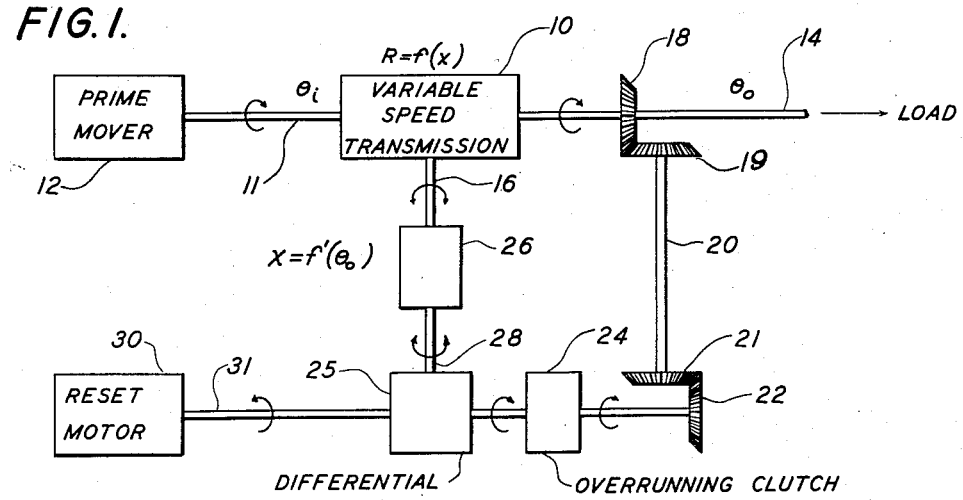
Fig. 1 is a block diagram of one form of variable speed transmission system in accordance with the invention, portraying a system wherein a velocity time relation is reproduced.

Referring to Fig. 1, the system there shown includes a variable speed transmission 10, which may be of any conventional type, having an input shaft 11 connected to be driven by a constant velocity prime mover 12 and an output shaft 14 adapted to be connected to a load (not shown). The transfer function $d\theta_o/d\theta_i$ of the variable speed transmission 10 is adapted to be adjusted within the design range by an adjusting shaft 16 which, in this case, is illustrated as effectuating adjustment by rotational motion.

Means for detecting the angular position of output shaft 14 ($\theta_o$) is represented by a first gear 18 affixed to rotate with the shaft and a second gear 19 mounted on a shaft 20 and meshed with the gear 18. Shaft 20 thus senses the angular position $\theta_o$ of transmission output shaft 14. Rotation of shaft 20 is transmitted through a coupling involving meshed gears 21, 22 and overrunning clutch 24 and a differential 25 to a control means 26 operable on the adjustment means 16.

Control means 26 represented in block diagram in Fig. 1 may comprise any desired form of cam or other mechanical expedient. In the event the position sensing means and the transmission loop are electrical in nature, electrical control means may be employed. In any event, control means 26 is such as to vary the rotational position of adjusting shaft 16 in a predetermined manner upon rotation of shaft 28 coupling differential 25 to the control means.

With respect to the transmission 10, the transfer function is given by the expression $$\frac{d\theta_o}{dt} \bigg/ \frac{d\theta_i}{dt} = \frac{d\theta_o}{d\theta_i} = f(x)$$

where $x$=the angular position of shaft 16. In the apparatus of the invention, "$x$" is in turn determined as a separate function of the output shaft position $f'(\theta_o)$, the separate function being determined by the mechanism 26, as for example by the shape of a developed cam if the mechanism 26 is in the nature of such a cam.

The apparatus of Fig. 1 is provided with a reset motor 30 having an output shaft 31 operable through differential 25 to reset control means 26 to the starting position, i. e. to the transfer function $R_o$ at zero time. This reset system is necessary only in instances wherein a rapid reset of the transfer function is required and where continuous rotation of the control means is impractical and is typified by the magnetic shunt arrangement as will be described in detail with relation to Fig. 5.

However, where the load is such as to be non-reversible and susceptible to continuous operation through succeeding identical cycles, reset motor 30, differential 25 and overrunning clutch 24 become unnecessary elements in the system as illustrated in Fig. 1, and the output shaft position sensing means, illustrated as gears 18, 19, and shaft 20 may be connected directly through suitable coupling to means 26.

Figure 2:
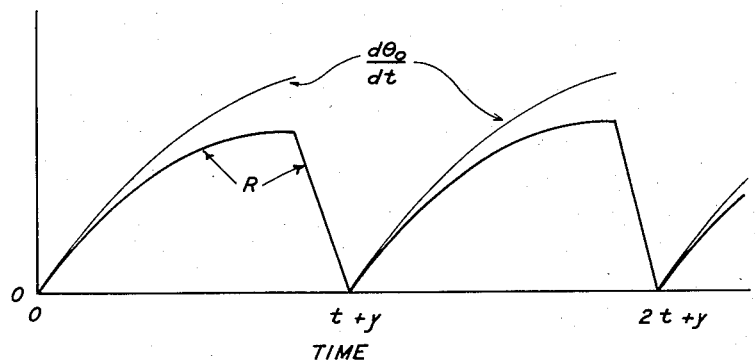
Fig. 2 is a graphic portrayal of the transmission output shaft velocity ($d\theta_o/dt$) plotted against time as developed with the apparatus of Fig. 1.

In Fig. 2 the output shaft velocity $$\frac{d\theta_o}{dt}$$

and transfer function $$\left(R = \frac{d\theta_o}{d\theta_i}\right)$$

are plotted separately in respectively identified curves as functions of time, the plots of course representing only a single adjustment pattern out of the infinite number available through suitable choice of configuration of adjustment means 26. The curves of Fig. 2 further typify the operation of the system in which reset is effectuated after each pattern cycle. In the figure, during the time interval from zero to time $t$, the output shaft velocity $$\frac{d\theta_o}{dt}$$

follows a predetermined pattern and in the time interval $t$ to $t+y$ the control shaft position is returned at a rapid rate to the starting value of transfer function whereupon it immediately repeats the same pattern.

Figure 3:
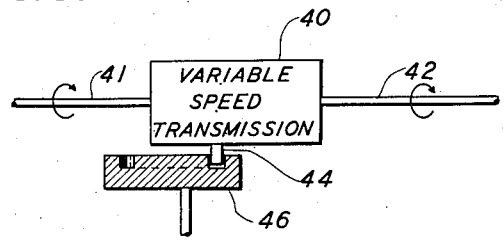
Fig. 3 is a diagram showing one form of adjustment means for effectuating variation in the transfer function of the transmission element, and adapted to be actuated in the manner illustrated in Fig. 1.

Fig. 3 is a diagram of one form of control device illustrated schematically at 26 in Fig. 1. A variable speed transmission 40 having input and output shafts 41, 42 respectively, is shown in the figure as provided with a transfer function adjustment in the form of a lever 44. In this example, lever 44 is adjusted by linear displacement as contrasted with rotary adjustment of means 16 illustrated in Fig. 1. In accordance with the invention, lever 44 is engaged in a cylindrical control cam 46, the cam, upon rotation responsive to the position of shaft 42, determining the position of lever 44. It is apparent that any relationship between the position of lever 44 and output shaft position $\theta_o$ can be obtained dependent upon the development of cam 46. It is noted that no reset mechanism is necessary in Fig. 3 apart from that which might be required by the particular nature of the load involved and which is not illustrated since lever 44 is captive with respect to cam 46. The control cycle may be repeated continuously without resetting the system to an output shaft position equivalent to that of zero time.

Figure 4:
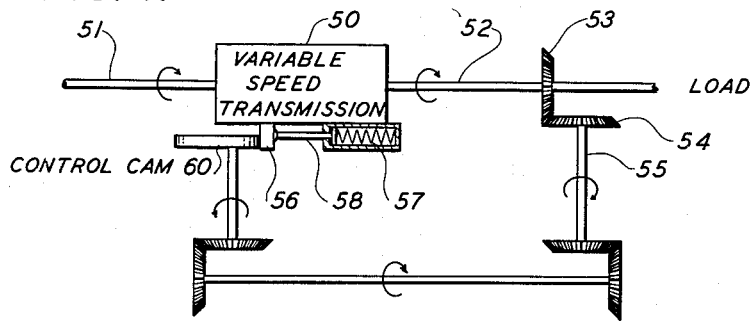
Fig. 4 is a diagram of another form of variable speed system wherein no resetting mechanism is required.

Additional means for accomplishing the same purpose is shown in the diagram of Fig. 4 which includes a variable speed transmission 50 having input and output shafts 51, 52 respectively. Output shaft 52 is provided with a shaft position sensing system embodying meshed gears 53, 54 and shaft 55 connected to the gear 54. In this embodiment the variable speed transmission is provided with a transfer function adjusting lever 56 which is spring-loaded against cam 60 by means of a captive helical spring 57 operating on lever 56 through a piston 58. A cam 60 is connected through a suitable conversion linkage to sensing shaft 55. Rotation of the cam is thus a function of the output position of transmission output shaft 52, which parameter in turn is a function of the developed surface of the cam. As previously demonstrated these two parameters are dependent variables.

Figure 5:
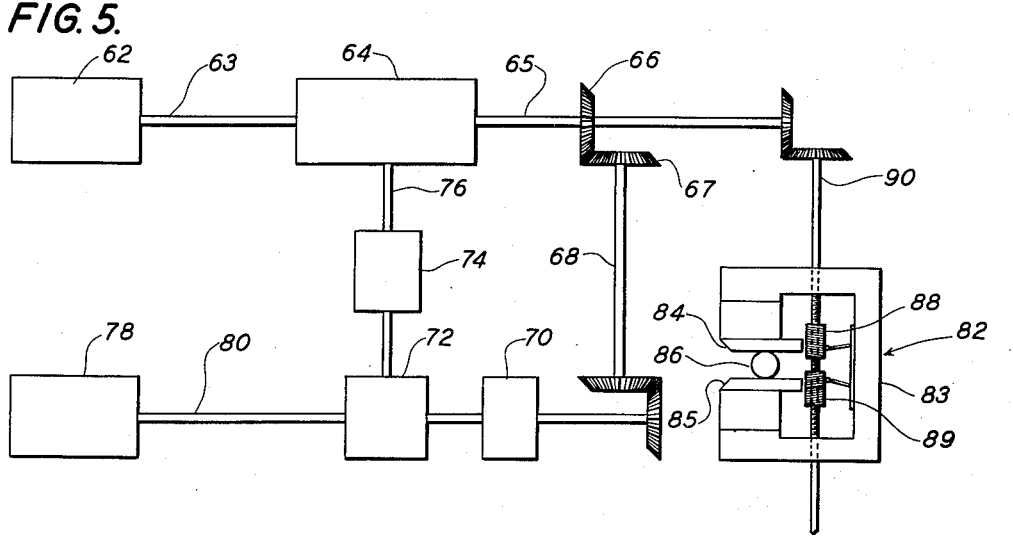
Fig. 5 is a block diagram of a transmission in accordance with the invention coupled to control a variable shunt magnet of a mass spectrometer.

Fig. 5 is a diagram of a transmission system in accordance with the invention as employed to operate a variable shunt magnet of a mass spectrometer. The system shown in this figure is identical with that of Fig. 1 as including a reversible constant velocity prime mover 62 connected through an input shaft 63 to a variable speed transmission 64. An output shaft 65 is connected through a sensing system represented by gears 66, 67 and shaft 68 to an overrunning clutch 70, a differential 72 and a control means 74 to a transfer function adjusting means 76 of transmission 64. A reset motor 78 is connected to differential 72 through shaft 80.

A variable shunt magnet is shown at 82 and comprises a yoke 83 having opposing pole pieces 84, 85 between which a mass spectrometer analyzer tube 86 is disposed. A pair of shunt elements 88, 89 are threaded on a shaft 90 in such a manner as to move in opposite directions upon rotation of the shaft. In this type of magnet as described in U. S. Patent No. 2,593,508, referred to above, the strength of the magnetic field across the gap in which mass spectrometer tube 86 is disposed is varied by varying the efficiency of the shunt path furnished by shunt elements 88, 89.

Figure 6:
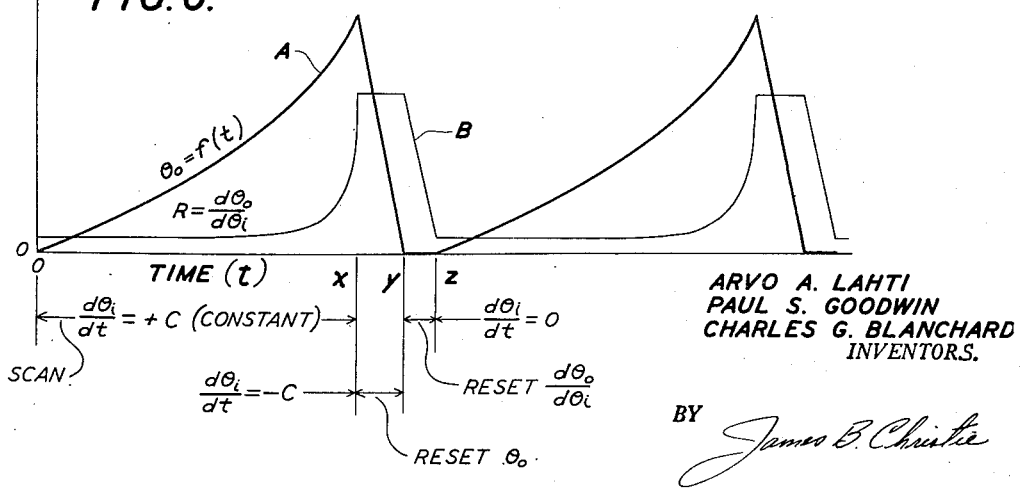
Fig. 6 is a graph showing the transmission output shaft position ($\theta_o$) and transfer function ($d\theta_o/d\theta_i$) as functions of time in the apparatus of Fig. 5.

The time function of output shaft position $\theta_o$ of shaft 65 is plotted as curve A in Fig. 6, the corresponding transfer function being plotted as curve B. Following curve A, $\theta_o$ varies as predetermined by the feedback function in the period $t=0$ to $t=x$. Thereafter in the period $t=x$ to $t=y\theta_o$ is reset rapidly to its $t=0$ position by reversing rotation of prime mover 62 and during which period variable shunts 88, 89 are similarly reset to the zero time value. During the time interval $t=0$ to $t=x$, the transfer function R, plotted as curve B in Fig. 6, varies in a predetermined manner. During the succeeding time period while $\theta_o$ is being reset, the transfer function does not change. In the period $t=y$ to $t=z$, auxiliary motor 78 is energized to rapidly reset the transfer function to its zero time value, during which interval there is no change in $\theta_0$. The system is thus restored to its initial condition and is ready for the next scan cycle The application of the instant invention to mass spectrometry as described illustrates but one of the many uses to which it can be put. The system is readily adaptable to a wide range of control functions because of the infinite variation possible in programming.

We claim:

1. In a mass spectrometer having an analyzer tube in which ions are sorted in accordance with their specific mass, and a variable shunt permanent magnet including magnet pole pieces disposed on opposite sides of the analyzer tube and shunt means adjustably supported adjacent the pole pieces, the combination comprising a variable speed transmission having an input means, an output means and adjustable means operable to vary the transfer function of the transmission, the output means being connected to the shunt means to control the position thereof, a prime mover connected to drive the input means, detector means operable to sense the angular position of the output means, and control means operable to control the adjustment means responsive to the position sensitive response of the detector means.

2. In a mass spectrometer having an analyzer tube in which ions are sorted in accordance with their specific mass, and a variable shunt permanent magnet including magnet pole pieces disposed on opposite sides of the analyzer tube and shunt means adjustably supported adjacent the pole pieces, the combination comprising a variable speed transmission having an input means, an output means and adjustable means operable to vary the transfer function of the transmission, the output means being connected to the shunt means to control the position thereof, a prime mover connected to drive the input means, detector means operable to sense the angular position of the output means, and control means operable to control the adjustment means in a predetermined relationship, the control means being operable responsive to the position sensitive response of the detector means.

3. In a mass spectrometer having an analyzer tube in which ions are sorted in accordance with their specific mass, and a variable shunt permanent magnet including magnet pole pieces disposed on opposite sides of the analyzer tube and shunt means adjustably supported adjacent the pole pieces, the combination comprising a variable speed transmission having an input means, an output means and adjustable means operable to vary the transfer function of the transmission, the output means being connected to the shunt means to control the position thereof, a prime mover connected to drive the input means, detector means operable to sense the angular position of the output means, control means operable to control the adjustment means between initial and terminal conditions and connecting means between the detector means and control means operable to actuate the control means as a function of the angular position of the output means as sensed by the detector means, whereby the shunt means is adjusted in a predetermined manner with respect to time.

4. In a mass spectrometer having an analyzer tube in which ions are sorted in accordance with their specific mass, and a variable shunt permanent magnet including magnet pole pieces disposed on opposite sides of the analyzer tube and shunt means adjustably supported adjacent the pole pieces, the combination comprising a variable speed transmission having an input means, an output means and adjustable means operable to vary the transfer function of the transmission, the output means being connected to the shunt means to control the position thereof, a prime mover connected to drive the input means, detector means operable to sense the angular position of the output means, control means operable to control the adjustment means between initial and terminal conditions, connecting means between the detector means and control means operable to actuate the control means as a function of the angular position of the output means as sensed by the detector means, whereby the shunt means is adjusted between initial and terminal conditions in a predetermined manner with respect to time, and means operable periodically to reset the system including the shunt means to the initial condition.

References Cited in the file of this patent

UNITED STATES PATENTS

| Number | Name | Date |
|---|---|---|
| 1,277,167 | Albrecht | Aug. 27, 1918 |